US006836270B2

(12) United States Patent
Du

(10) Patent No.: US 6,836,270 B2
(45) Date of Patent: Dec. 28, 2004

(54) 3-D MAP DATA VISUALIZATION

(75) Inventor: Mike Du, Calgary (CA)

(73) Assignee: Geojet Information Solutions, Inc., Calgary (CA)

(*) Notice: Subject to any disclaimer, the term of this patent is extended or adjusted under 35 U.S.C. 154(b) by 206 days.

(21) Appl. No.: 10/136,303

(22) Filed: May 2, 2002

(65) Prior Publication Data

US 2003/0011599 A1 Jan. 16, 2003

(30) Foreign Application Priority Data

Jul. 10, 2001 (CA) ............................................. 2352844

(51) Int. Cl.$^7$ .............................................. G06T 15/00
(52) U.S. Cl. ..................................... 345/419; 345/764
(58) Field of Search ............................... 345/419, 423, 345/428, 835, 764, 810, 962, 440, 803, 804, 854, 841; 340/990, 995.27; 705/26, 27; 701/207, 208, 213, 214; 707/3, 4, 5, 10, 100, 102, 200; 715/512

(56) References Cited

U.S. PATENT DOCUMENTS

| | | | | |
|---|---|---|---|---|
| 5,781,773 A | * | 7/1998 | Vanderpool et al. | ........ 707/100 |
| 5,852,810 A | * | 12/1998 | Sotiroff et al. | ................ 705/27 |
| 6,307,573 B1 | * | 10/2001 | Barros | ........................ 345/764 |
| 6,323,885 B1 | * | 11/2001 | Wiese | ......................... 345/835 |
| 6,385,541 B1 | * | 5/2002 | Blumberg et al. | .......... 701/213 |
| 6,397,208 B1 | * | 5/2002 | Lee | ............................... 707/3 |

* cited by examiner

Primary Examiner—Almis R. Jankus
(74) Attorney, Agent, or Firm—Blake, Cassels & Graydon LLP; Terry L. Leier

(57) ABSTRACT

Discloses a method and design for map based visualization and presentation of geographic features, terrain and property characteristics. A list of terrain attributes or group of properties are listed in one display area and a corresponding map with symbolized and coordinated property is displayed in a second display area. A property of interest is provided with a property box graphic on the map with the property box containing selected characteristics of the property and anchored at the location of the property. A three-dimensional (3-D) property characteristics model is disclosed which provides a visualization of selected property characteristics. The 3-D model supports visual analysis and comparison of a characteristic of a property to its neighboring properties. The 3-D visualization and analysis model may also be used to evaluate the proximity of a property to a natural hazard.

36 Claims, 5 Drawing Sheets

3-D MAP DATA VISUALIZATION

FIELD OF THE INVENTION

This invention relates to computer based graphical information display systems and more particularly to a system for generation of three dimensional (3-D) representations of data relating to a geographic map on a computer display.

BACKGROUND OF THE INVENTION

Real Estate is about "Location, Location, and Location". The value of real property varies with the location of the property. Whether it is in a cul-de-sac, close to a major transportation, facing a lake, sitting in a busy downtown area, or far way from a natural/environmental hazard zone, has a significant effect on its value and uses.

Traditionally, paper maps and knowledge of the region are used to address the location related aspects of a property. For example, to describe a property for sale, a Realtor may characterize the property as being close to a school and within a safe established neighborhood. When the Realtor is promoting a property to a potential buyer, the realtor may point to the location of the property on a paper street map, or on a municipal plan map.

As another example, to respond to an appeal of the assessed value of a property by the property owner, a municipal assessor may list the assessed values of the neighboring property and support the conclusion that the current assessed value of the subject property is within a normal range of the neighborhood.

In both cases, face-to-face descriptive language is used to present the location and characteristics of the property.

With the advent of computerized mapping and Internet map delivery, electronic maps are used to replace the paper maps and show the location of the property by displaying a symbol on the map. These maps are often overlaid with school districts, natural hazard zones, points of interests, and municipal zonings, etc.

Prior art examples of computer based geographic information systems include U.S. Pat. No. 6,229,546 for Rapid terrain generation with 3-D object features and user customization interface; U.S. Pat. No. 5,179,638 to Method and apparatus for generating a texture mapped perspective view; U.S. Pat. No. 5,359,526 to Terrain and culture generation system and method and U.S. Pat. No. 6,023,278: Digital map generator and display system.

SUMMARY OF THE INVENTION

The subject invention relates to visualization and presentation of property characteristics in the context of an electronic, computer-based map.

Electronic map based presentation of real property has many advantages including the following:

1. Trust/efficient communication. Instead of describing the location characteristics of a property in a lengthy comprehensive language, a map showing the location and overlaid with the neighboring facilities speaks volumes. Without seeing it on a map or on the real ground, the receiver's perception of the locational characteristics of the property is vague and the receiver is doubt of the claims/decision made on the property. A picture is worth thousands of words.
2. No face-to-face meeting is needed. With better presentation and business analysis tools, a property owner may not need to go to City Hall to deal with a property assessment complaint. A home buyer may save a trip to visit a property that does not have satisfactory location characteristics.
3. Beautiful presentation. Electronic based map presentation offers a beautiful high standard of professionalism.

1. Terms

In this disclosure, the certain terms are used to describe features of the invention or the context of an aspect of the invention as more particularly set out as follows, namely:

Three-D (3-D) Property Characteristics Model—is a term used to name the virtual 3-D volume as disclosed herein. The parcel shape of a property on the surface of the earth is projected into a two-dimensional plan and used as the horizontal dimension of the 3-D model. One or more characteristics of the property are modeled as the vertical dimension of the model.

Property Box—is a term used to name the property characteristics presentation graphic on a map or graphical display.

Three-D Land Scene—a term describing the combination of a 3-D digital terrain model overlaid with landmark features.

Conclusion Mark—a conclusion drawn on the subject matter of the subject property.

Subject Property—describes the property of interest in visualization and analysis.

Subject Characteristic—refers to one or more characteristics of the property in visualization and analysis.

Three-D (3-D) Digital Terrain Model—a 3-D model for the earth's surface drawn on a display device or modeled in digital format.

Thematic Map—a map showing the variation of a subject over the earth's surface and drawn on a display device or modeled in digital format.

Lighting Source—a light source in a 3-D scene to generate the brightness and shadow effect in a 3-D rendering of the scene.

Natural Hazard—fire, flood, earthquake, or environmental disaster, etc. on the earth's surface. A natural hazard is projected into a 2-D coordinate plan and represented as polygons, each with a different hazard index.

One aspect of the invention deals with visualizing a group of properties on a map. The visualization is presented on a computer display, where the display area is divided into two parts. The first part of the display area provides a list of the properties of interest. The second part displays a map with the properties displayed as symbols on the map. Selecting a property in the map will highlight the property on the map. Clicking a property on the map will highlight the property in the list. In response to moving a mouse cursor over the top of a property symbol on the map, a bubble will pop up displaying a selected subset of the property characteristics.

Another aspect of the invention deals with labeling properties on the map for presentation. The property of interest is labeled using a property box on the map. The property box may contain picture of the property, selected characteristics of the property, and real estate agent information relating to the sale of the property. The property box anchors at the location of the property on the map. Leading lines are drawn from the property box to the anchor point.

Another aspect of the invention deals with 3-D visualization of property values on a computer display. The parcel/lot shape of the property on the earth is displayed as two dimension of the property. The value of the property is displayed as the third dimension of the property. The value of the property is labeled at the top of the 3-D model. The house number of the display is displayed along one side of the 3-D model. The subject property is drawn with different drawing styles. A 3-D surface may be displayed representing the average value of the property in comparison.

Another aspect of the invention deals with visualization of a property's proximity to natural hazards. 2-D base maps or 3-D digital Land Scenes are displayed as the background frame supporting the comparison. The 3-D digital Land Scene is a combination of 3-D digital terrain model coordinated with labels, lines, polygons, and animated images. Natural hazard zones are displayed as a transparent 3-D volume on top of the digital Land Scene. The property is overlaid at its geographic location in the 3-D Land Scene. Conclusion marks on the subject property are displayed outside, but close to, or inside the property display.

DETAILED DESCRIPTION OF THE INVENTION

Figure 1:
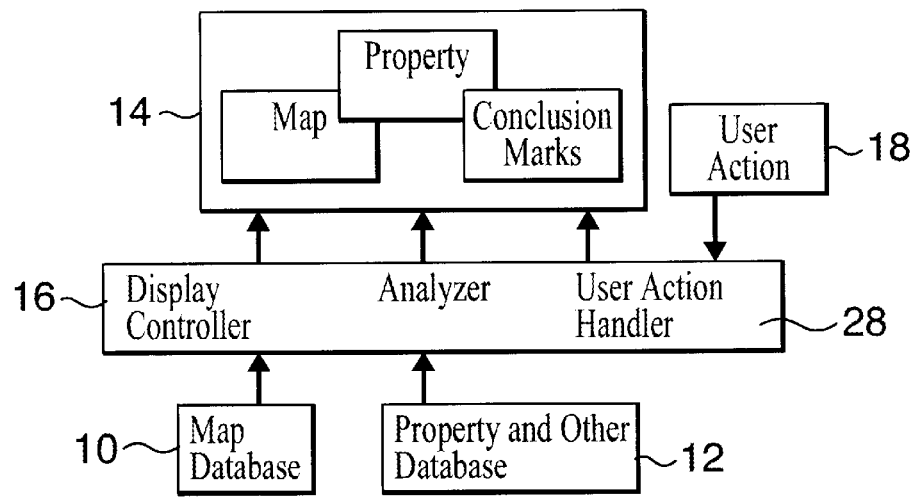
FIG. 1 is a data flow diagram of a system for map based visualization and presentation of properties implemented in accordance with the principles of the invention.

FIG. 1 illustrates a typical architecture of a map based property visualization system used to create the inventive display. A map data database 10, property databases, and other related databases 12 such as flood zone thematic map databases are stored in a physical media. A display media 14 shows overlaid or spatially coordinated drawings of base maps, properties, thematic map layers, and conclusion marks on the property. Computing units 16 sit between the two media to retrieve data from database and send the data to the display media device. The computing units also derive an analytical conclusion of the subject project and change the display in accordance with the user's action 18.

This invention deals with the design and layout of elements shown in the Display Block in FIG. 1. As illustrated, the display elements have certain order of priority when one is overlapped with another. The natural hazard layer for comparison is not shown in the figure as it is not always present.

Visualizing Group of Properties on the Map

Figure 2:
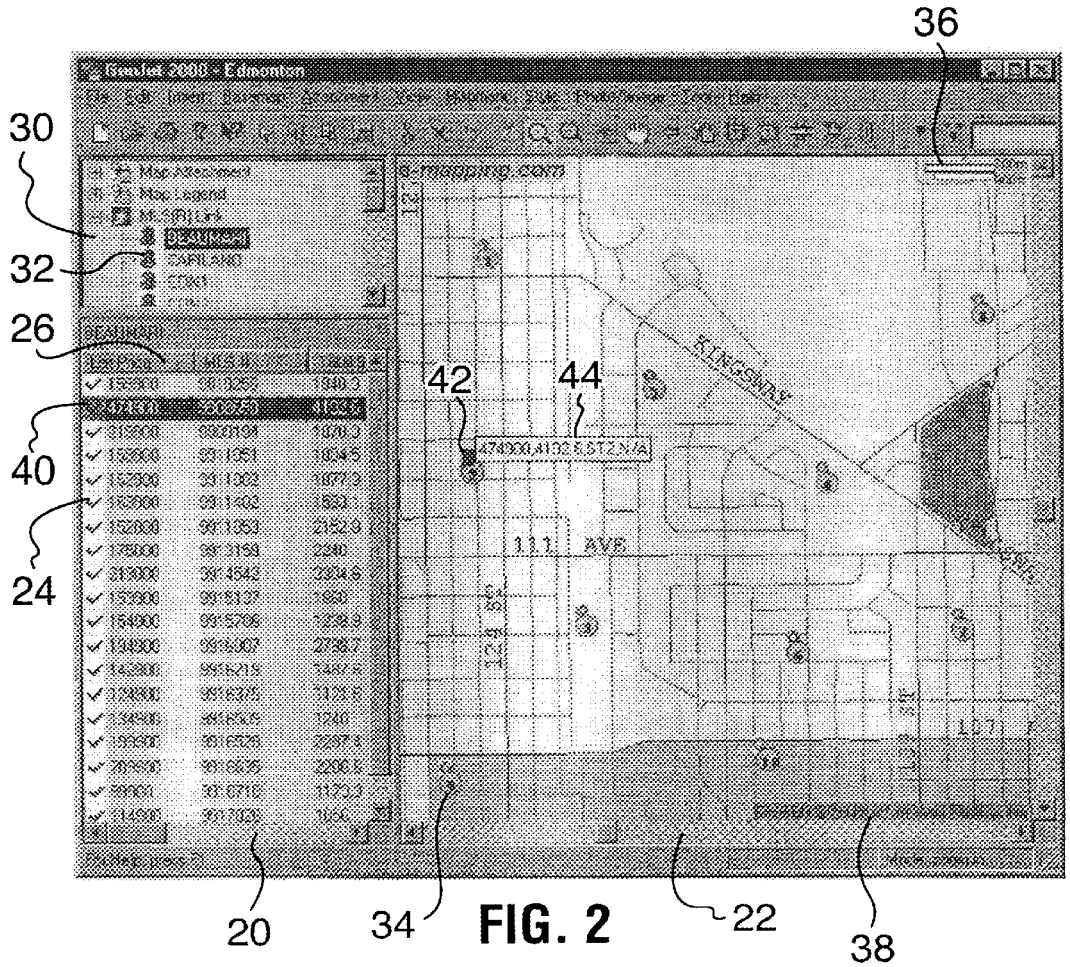
FIG. 2 is an example output display showing a map and properties attributes

FIG. 2 illustrates the visualization of a group of properties on the map. The display contains two parts with one part designed for the property characteristics and the other for the location of the property symbolized and geographically coordinated on the map. The first part is called the list display 20. The second part is called the map display 22.

One typical display of property characteristics is a table-like list. Each row 24 is a property. Each column 26 is one characteristic of the property. Input means 28 are constructed to allow users add, remove, or change order of the columns, and sort the properties based on one or a group of characteristics. An alternative display of the property characteristics is a list of graphical symbols 30. Each symbol 32 is a representation of one property and designed visually representing one or a group of the characteristics of the property. One example of a symbol list is a list of property pictures. Another example is a list of property values. Still another example is a list of property pictures with property values labeled on the picture. One more example of the display is a list of characteristics of one property. Each row in the list 30 is a characteristic of the property.

The map display 22 is a plurality of graphics representing map features on the earth's surface, and a plurality of symbols 34 representing the location of the properties listed in the first part of display 20 (see above). The style of the symbol, size, geometrical shape, and color, is designed in accordance with one or more characteristics of the property represented. For example, the red color may be set to the symbol to illustrate that the property is sold. The green color is used to illustrate that the property is active. The shape of the symbol may be designed according to the style (tow story, bungalow, condo) of the property.

The second display 22 area contains two scale bars at the top right corner of the display. The two scale bars are for metric and imperial units respectively. When the scale of the map display changes, the scale bars change automatically. The length of the scale should not exceed one inch on the map display. The bottom right of the display contains the copyright notice 38 of the map system.

The two display parts 20,22 are visually coordinated. Selecting one property entry 40 in the list display 20 will select and highlight the property symbol 42 corresponding to the selected property in the map display. If the symbol is not visible in the current map display, the map display 22 is re-centered to make the property symbol visible. Selecting a property symbol 42 in the map display 22 will select and highlight the corresponding property entry 40 in the list display 20. If the property is not visible in the list display, the list is re-scrolled to make the property entry visible.

If the devices used in the visualization system have a mouse, when the mouse cursor is over the top of a property symbol in the map display 22, a bubble 44 will pop up to display one or more of the property's characteristics.

Labeling Properties on the Map

Figure 3:
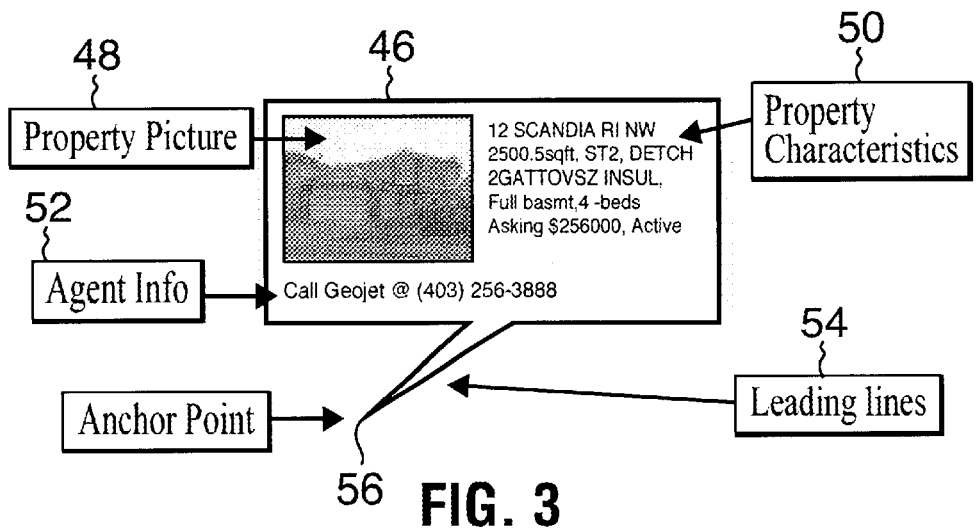
FIG. 3 is an exemplary output display showing an output properties attributes graphic

FIG. 3 shows a property box 46 which is used to present other information corresponding to property symbols displayed on the map display 22, and is composed to display selected characteristics of the property represented by a property symbol. In the embodiment of the property box 46 shown in FIG. 3, the property box contains four parts. The first part is a picture 48 of the property. The picture may be a photo of the house, an aerial photo of the land, or simply a hand sketching of the property. The second part 50 lists text describing selected characteristics of the property. The third part 52 displays contact information. The contact information part may contain the name, company, phone or other contact information of the person who creates the presentation or who is available to contact for further information. This part may also contain a photo of the contact person. The fourth part contains lead lines 54 extending from the property box to the location of the property of the map. The end point 56 of the lead lines is called the anchor point. When the property box 46 is present in the map display area 22, the anchor point 56 will be coincident with the location of the corresponding property symbol.

The display styles of the box, that is, the color, line, font, layout, and picture size, are all setable in response to a user's input. Users may move a mouse cursor over a corner or an edge of the picture, and the mouse cursor will change shape indicating the type of changes users can perform on the picture. For example, the picture can be resized using the following sequence. The user positions the mouse cursor on a corner of the picture, presses the mouse button, then holds down the mouse button, and moves the mouse cursor to a new location, and then finally releases the mouse button. The picture will resize in accordance with the movement of the mouse applied. Other operations such as stretching or moving the picture can be performed as well.

Also the mouse cursor can change shape when it is over the property characteristics 50 portion of the property box 46. When the mouse cursor is a predetermined shape, clicking the mouse button will initiate a session to edit the property characteristics 50 itself, or to edit the display style of the property characteristics. After the property characteristics 50 information is changed, the property box 46 is resized automatically to display the information.

The anchor point 56 and position of the property box 46 may be changed by users. After the change, the lead lines are redrawn in accordance with the orientation of property box 46 relative to the anchor point 56 selected by the user.

Figure 4:
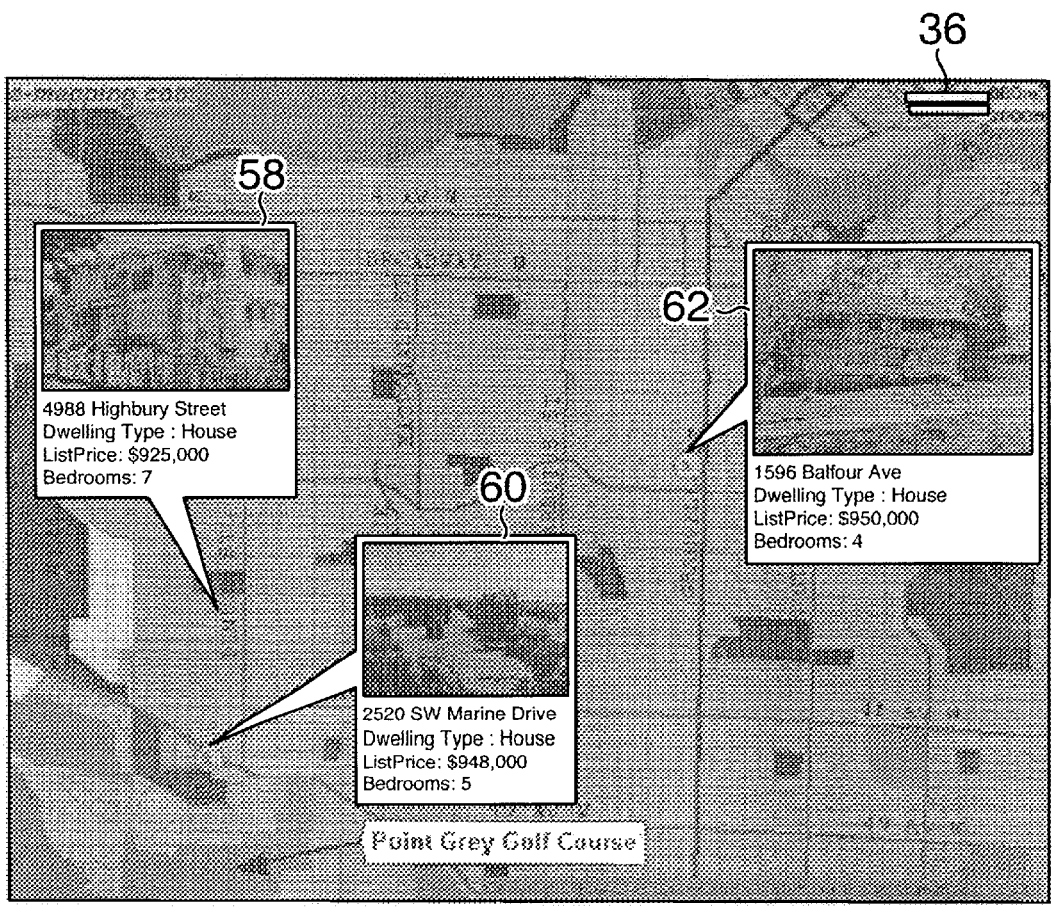
FIG. 4 is an example output display showing a map and properties attributes providing output of comparative property values

FIG. 4 illustrates three properties displayed using property boxes 58, 60 and 62. The display shows a comparative market analysis of sales in the region. In the embodiment of the property boxes shown in FIG. 4, the contact information is not shown, but the property boxes are depicted with varying orientations of the property boxes relative to their respective anchor points to illustrate the variations of the property boxes just described. As another variation of the contents of the property boxes, if the sold prices of the properties are included in the property characteristics contained in the property boxes, then the information can be used to illustrate the real estate sales value status of the displayed region.

Visualization of 3-D Property Characteristics Model

A real estate property has a physical location and dimension on the earth's surface. In this disclosure, the land comprising the property on the earth's surface and owned by the same owner is referred to as the property boundary, property land boundary, or land parcel. The boundary of the property on the earth's surface can be approximated as a polygonal shape in a two dimensional plan. Naturally, the polygonal shape may contain curves to correspond within the land parcel. It may refer to the property boundary or the entire land portion of the property or just the boundary or foot print of a building constructed on the property.

Figure 5:
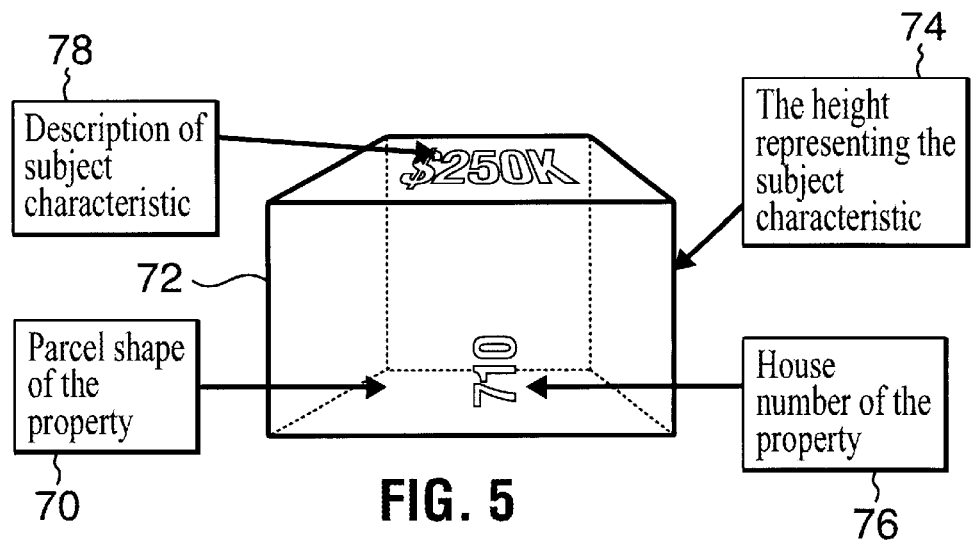
FIG. 5 is an exemplary output display detailing a 3-D output graphical element

A characteristic of the property, for example, its assessed value or risk factor, is modeled in a vertical dimension, that is height. The vertical dimension is considered equal among any points within the polygonal shape. The two-dimensional shape on the earth's surface and the vertical (virtual) dimension of the property characteristic form a 3-D Property Characteristics Model (as shown in FIG. 5). If the property has a square polygonal shape on the earth's surface 70, the 3-D property characteristics model is a cube 72. In such a 3-D model, the vertical dimension 74 of the property land parcel, that follows the height of the earth surface, is not taken into account. Instead, the 3-D land parcel of the property on the earth's surface is projected into a two dimensional plan.

To further enrich the 3-D model, an identifier 76, which may be the house number, or the tax roll number, or title number, of the property is displayed along a side face or side surface of the 3-D model of the property. The characteristic visualized in the vertical dimension is displayed at the top side of the 3-D model 78.

Figure 6:
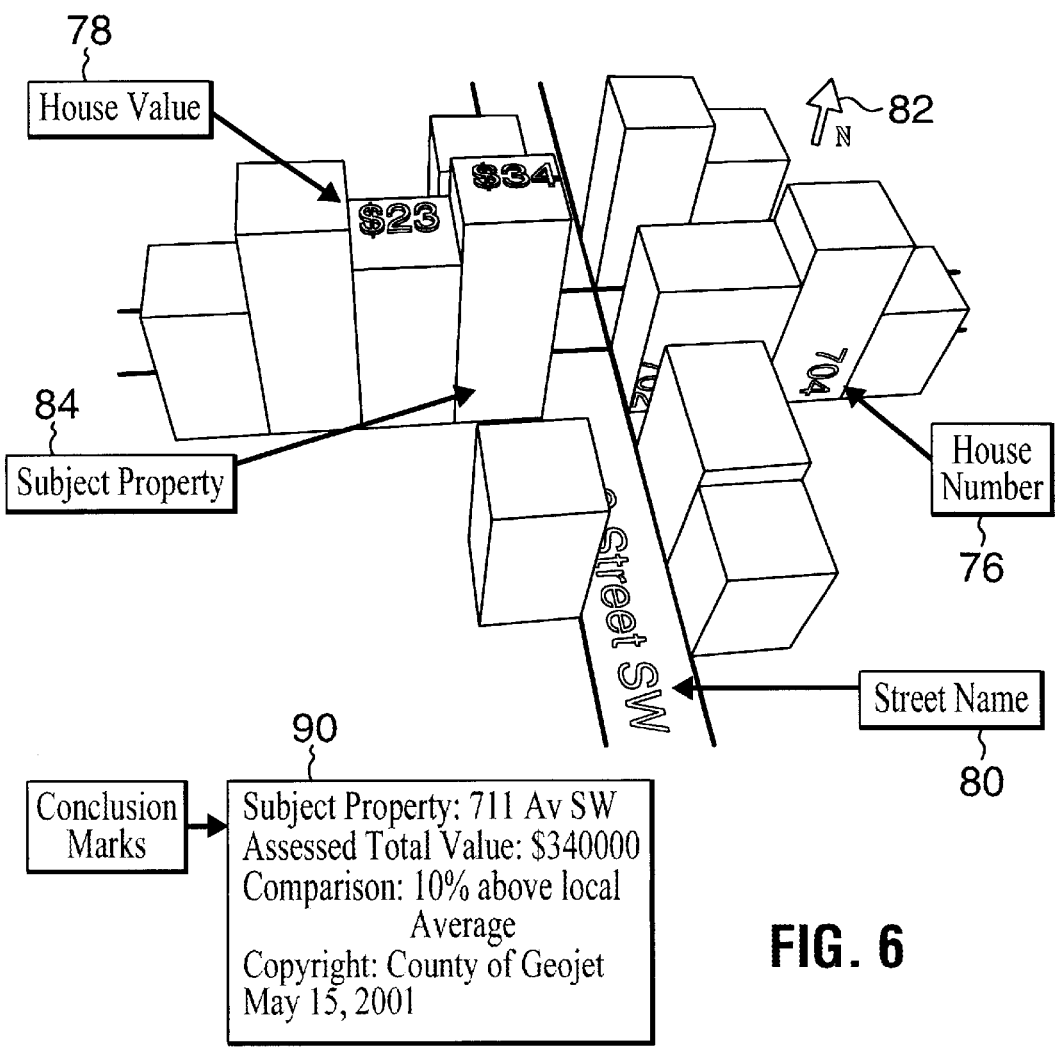
FIG. 6 is an exemplary output display detailing a plurality of 3-D output graphical elements coordinated with a geographic map display.

FIG. 6 is a representation of the 3-D property characteristics model as viewed on a two dimensional display device by common 3-D computer graphics technologies. In the virtual 3-D scene, street names 80 and a North arrow 82 are displayed to visualize physical location of the properties on the earth's surface. Site names, landmarks, aerial photos or latitude, longitude grids may be displayed to serve the same purpose as street names do.

To compare one characteristic of one property with that of neighboring properties, the 3-D property characteristics models of the properties involved in comparison are displayed. The characteristic to be compared, for example house value 78 is shown in FIG. 6, is called the subject characteristic. The property to be compared 84 is called the subject property. The subject characteristic 78 of each property is displayed at the top of the property's 3-D characteristics model. The color of each property's side faces may be determined in accordance with another characteristic of the property.

To illustrate the contrast of the comparison, the 3-D model of the subject property is displayed with styles different from comparing property. The styles may include, color, brightness, shadow effect, etc. A virtual lighting source may point to the subject property to present the contrast. A text box 90 is used to contain a description of the conclusion of the comparison of the subject characteristic of the subject property. Preferably, the text box 90 containing the conclusion description is displayed outside and close to the subject property display area or, if space permits, in a place within the subject property display area.

Figure 7:
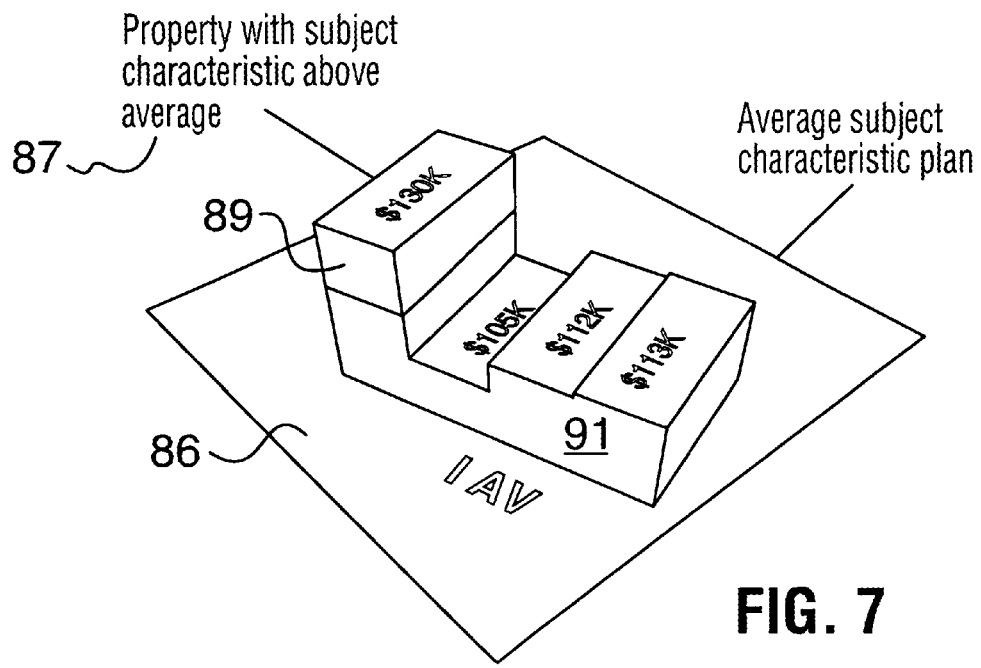
FIG. 7 illustrates use of a plane to represent a conclusion, namely, the average value of a subject characteristic using the average of the subject characteristic for all properties in the locale shown at a height corresponding to the average value on the plan in the 3-D scene.

FIG. 7 furthers illustrates providing a subject characteristic that is graphically contrasted with other factors by use of a plane to represent the average value of the subject characteristic using the average of the subject characteristic for all properties in the locale. In FIG. 7, the value of a property is the subject characteristic and an average value of that subject characteristic is drawn as a plane 86 at a height corresponding to the average value on the plan in the 3-D scene. As shown in FIG. 6, the surfaces of a 3-D model 87 extending above the average height plane 86 may be drawn with a style 89 above the plane that is different from the style 91 used to display surfaces of the 3-D model below the average plan. The style differences can include variations in surface color, texture or shading.

The drawing of the 3-D model on the display device may be changed by the scale used in the vertical dimension, the scale used in horizontal dimension, the color used, and the perspective view and closeness of the viewer to the virtual 3-D scene. Input means are constructed to allow viewers change these parameters. The 3-D scene or the viewer's location may be changed or the 3-D model rotated to facilitate the visualization. In such a dynamic environment, the label of characteristics 78 and street names 86 may be transposed or turned upside down. To maintain readability, it is preferable for the labels to be flipped over or rotated 180 degrees if they are turned upside down or transposed, relative to the viewer.

The 3-D model may be drawn using transparent surface shading or as opaque surfaces. Naturally, when the surface is drawn in opaque, any objects hidden by the surfaces will not be visible.

Visualization of Properties' Closeness to Natural Hazard

FIG. 7 illustrates a visualization model used for graphical display of a property's closeness to a natural hazard. The model is the basis for the visualization, analysis, and presentation of a subject property's proximity to a natural hazard.

As shown in the Figure, the visualization model contains four parts or four layers. The first layer is a base map layer 100. It is a coordinated display of 2-D labels, aerial photos, lines and polygons representing the regional geographic features, surrounding or enclosing the subject property. These features include streets, jurisdiction boundaries, hydrology data, geographic coordinate grids, or topography contour lines. These features are projected from a 3-D terrain surface to a 2-D map coordinate system of the base map layer.

The second display layer is the natural hazard zone layer 102. It consists of polygon shapes geographically coordinated and overlaid with the first base map layer. This layer is drawn in transparent mode so the underlying base map and subject project, if there is any, is visible.

The third display layer is the subject property layer 104. It is a symbol geographically coordinated and overlaid with the base map layer. The style of the symbol is designed in accordance with one or more characteristics of the property. In general, the base map layer 100 will be centered around the location of the subject property 104 when presented on a display device.

The fourth display layer is the conclusion layer 106 containing marks drawn by an analytical apparatus on the closeness of the subject property to the natural hazard zone. When the conclusion layer 106 is presented on a display device, it can be displayed outside but close to the base map display, or inside the base map as presented on the display device. A typical position for the conclusion marks will be a corner and along an edge of the base map if drawn inside the base map. An example position is the left bottom corner if the top right corner displays the scale bar and the bottom right corner displays the copyright notice.

The conclusion marks include the shortest distance from the subject property to the natural hazard zone if the subject property is outside the natural zone. The shortest distance is represented by a combination of horizontal component and vertical component whenever possible. This is highly preferable, for example, when evaluating flooding risk factors. The shortest distance in vertical dimension may be measured from the lowest point of the subject property to the closest point in the boundary of the natural hazard zone.

Figure 8:
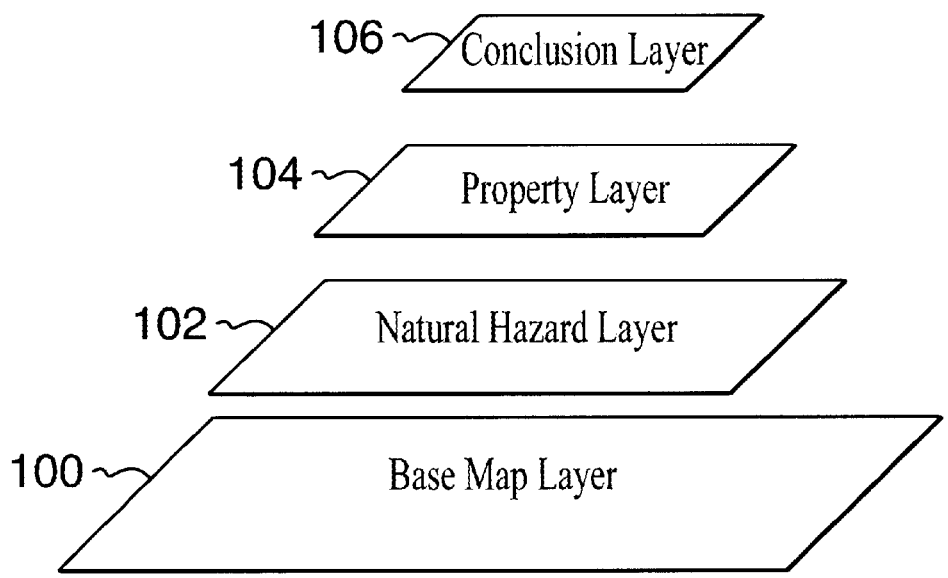
FIG. 8 is a drawing of the data layers of a hazard visualization model showing the relationship of the data layers used to provide visualization of the proximity of a property to a hazard.
Figure 9:
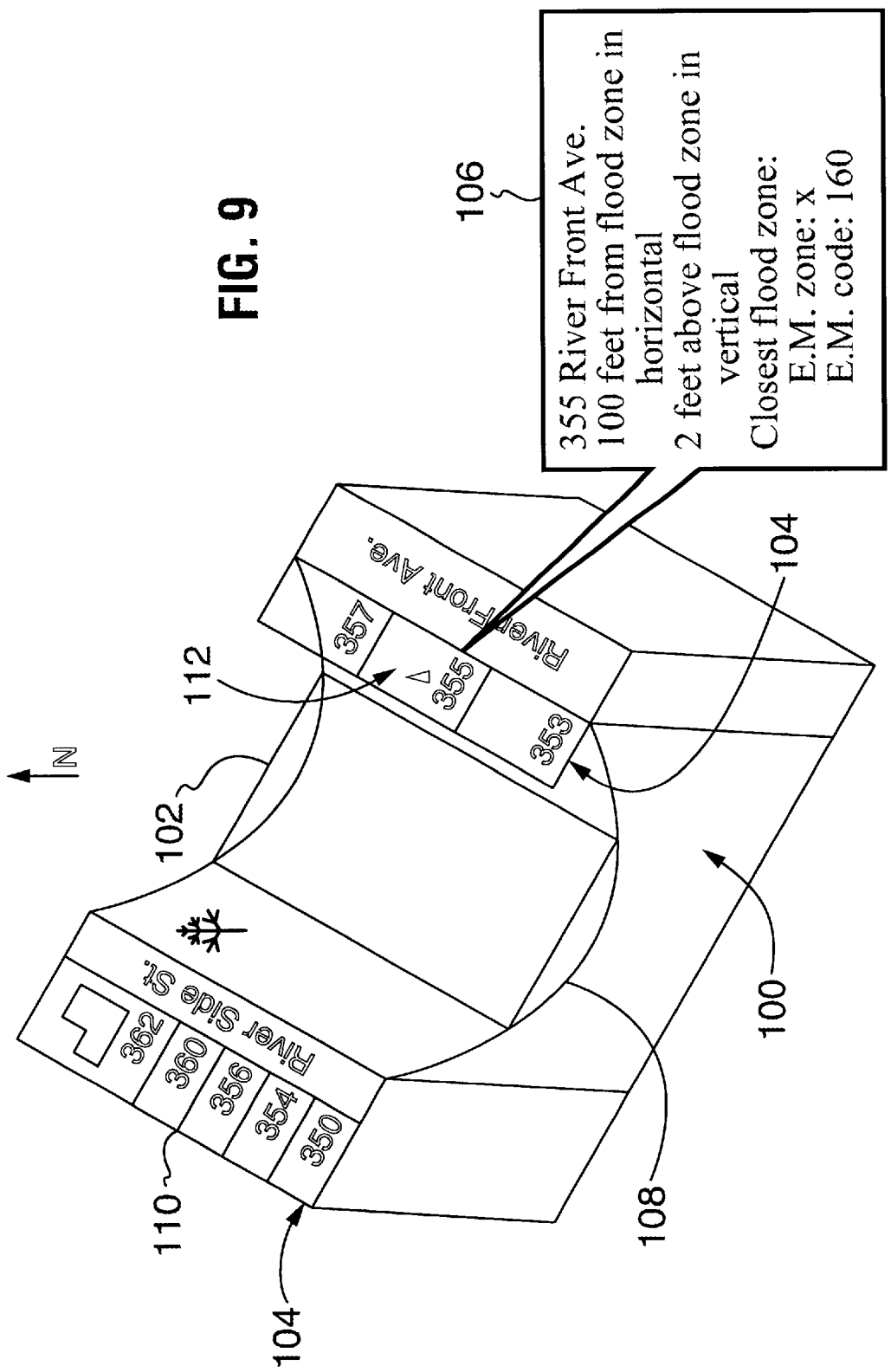
FIG. 9 is a natural hazard 3-D depiction implementing an example of the natural hazard 3-D visualization of FIG. 8.

FIG. 9 is a natural hazard 3-D depiction implementing an example of the natural hazard 3-D visualization of FIG. 8. A base map 100 shows a 2-D projection onto the display area of a 3-D base map of a portion of the earth's surface. A natural hazard layer 102 depicts a flood zone showing a transparent surface in partial coverage of the valley 108 across which the natural hazard layer flood zone 102 extends. A property layer 104 is depicted showing a plurality of parcel boundaries 110 on either side of the geographic valley 108. A conclusion layer 106 is shown on the right portion of the drawing corresponding to the subject property 112 to which the conclusion layer corresponds. The conclusion layer includes a text describing the horizontal displacement of the subject property from the natural hazard layer 102, vis. 100 feet from flood zone and horizontal. Moreover, the conclusion layer 106 describes the vertical displacement of the subject property with respect to the upper surface of the natural hazard layer 102 as being two feet above the flood zone in the vertical. The closest flood zone is described by identifying the emergency measures (EM) zone and an emergency measures code 160. The authority responsible for maintenance of the natural hazard information, in the example shown the flood zone layer, will depend on the government of the jurisdiction in which the map is produced. Flood zones may be monitored by a national or federal agency or may be the responsibility of individual national entities such as states or provinces. For natural hazard layers that are within municipal boundaries, the city or municipal corporation responsible for the area may be the emergency measures organization that produces the data which the natural hazard layer will depict. FIG. 9 shows the assimilation of this material into a display to provide a visually perceptible depiction of the data as correlated onto a base map layer that includes the natural hazard information, the property and parcel boundary information as well as the conclusion which is produced to correspond to a particular subject property 112 in relation to the natural hazard layer 102.

An alternative display to a 2-D base map's display is a view of a 3-D digital terrain model coupled with map features, such as labels representing place names, lines representing jurisdiction boundaries, streets, and animated polygons for flowing rivers, etc. Trees and landmarks may be represented on the scenes displayed as well. The combination of the 3-D digital terrain model and the map features is called a 3-D Land Scene. In this case, natural hazard zone is projected onto and overlaid with the 3-D Land Scene. If the vertical dimension of the natural hazard is not known, it is derived from the horizontal position of the natural hazard and the 3-D terrain model. The same processing is applied to the subject property.

User input means are presented to adjust the layout and styles of the objects in this 3-D Land Scene display model. Rules are applied to ensure that the priority of display is in the order of conclusion marks, subject property, natural hazard, and base map. As was discussed in relation to the FIG. 6, the labels will be automatically rotated if they are upside down to the user when the base map is rotated. A lighting source may be setup to point automatically to the subject property when the user turns it on. The light source routine can be provided with controls to enable the user to change the color and brightness of the lighting source. The position and content of conclusion marks can be edited by users.

I claim:

1. A property and presentation visualization system comprising:
    (a) a first display area for presentation of a plurality of properties of interest and their respective characteristics,
    (b) a second display area for presentation of a map with the properties of interest in the said first display area each provided with a symbol at the location of the respective property of interest on the map,
    (c) at least one scale bar at a corner of the second display area, each scale bar corresponding to a measurement system distance unit and redrawn automatically after the scale of the map display changes, and
    (d) the said first display area is visually coordinated with the said second display area wherein selecting a property of interest in the first display area will select and highlight the corresponding symbol in the second display area and vice versa.

2. A property visualization system as claimed in claim 1 further comprising a list of graphical symbols for representation of properties of interest in the said first display area.

3. The system as claimed in claim 1, wherein the length of the scale bar does not exceed one inch on the second display area.

4. A property visualization and presentation system as claimed in claim 1 further comprising display of a 3-D Land Scene in the said second display area.

5. A property visualization and presentation system as claimed in claim 4 further comprising means to provide a vertical dimension of the properties of interest corresponding to a horizontal position of the properties of interest in the 3-D Land Scene.

6. A property visualization and presentation system comprising a property box for presentation of properties on a map, the said property box comprising:
    (a) a display area containing a picture of a property,
    (b) a list of selected textual characteristics of the property,
    (c) contact information, and
    (d) lead lines drawn from the property box to an anchoring point of the location of the property on a map.

7. A property visualization and presentation system as claimed in claim 6, the property box further including a boundary line surrounding a background.

8. A property visualization and presentation system as claimed in claim 7 wherein the boundary line comprises interconnecting curves or a mixture of curves and lines forming the boundary line of the property box.

9. A property and presentation visualization system comprising:
    (a) a first display area for presentation of a plurality of properties of interest and their respective characteristics,
    (b) a second display area for presentation of a map with the properties in the said first display area being symbolized at the location of the properties on the map,
    (c) the said first display area is visually coordinated with the said second display area wherein selecting a property in the first display area will select and highlight the property in the second display area and vice versa, and
    (d) a property box including:
        (i) a display area containing a picture of the property,
        (ii) a list of selected textual characteristics of the property,
        (iii) contact information, and
        (iv) lead lines drawn from the property box to the anchoring point of the property's location on a map.

10. A property visualization and presentation system as claimed in claim 9 further including at least one scale bar at a corner of the second display area, each scale bar corresponding to a measurement system distance unit and each scale bar redrawn automatically after the scale of the map display changes.

11. The system as claimed in claim 10, wherein the length of the scale bar does not exceed one inch on the display.

12. A property visualization and presentation system as claimed in claim 9 further comprising display of 3-D Land Scene in the said second display area.

13. A property visualization and presentation system as claimed in claim 9 further including textual conclusions displayed in the second display area.

14. A property visualization and presentation system comprising a 3-D property characteristics model comprising:
    (a) the parcel shape of the property's land on the earth surface forming the horizontal dimension of the property,
    (b) at least one characteristic of the property as the vertical dimension of the property, and
    (c) vertical dimension of the parcel shape modeled as zero(0), or the bottom of the 3-D model.

15. A property visualization and presentation system as claimed in claim 14 further comprising a regular shape (circle, rectangle, or a point) inside the property parcel boundary being used as the bottom of the said 3-D model.

16. A property visualization and presentation system as claimed in claim 15 further comprising:
    (d) the selected characteristic of the property used to form the vertical dimension being labeled at the top of the said 3-D model,
    (e) one or more characteristics of the property, for example, house number, being labeled at the side of the said 3-D model, and
    (f) the color of the top and side of the 3-D property model being determined in accordance with characteristics of the property.

17. A property visualization and presentation system as claimed in claim 16 further comprising a horizontal plan representing the average value of the characteristic of interest wherein the vertical distance from the plan to the bottom of the 3-D model is in scale to the average value of the characteristic of interest.

18. A property visualization and presentation system as claimed in claim 15 further comprising a horizontal plan representing the average value of the characteristic of interest wherein the vertical distance from the plan to the bottom of the 3-D model is in scale to the average value of the characteristic of interest.

19. A property visualization and presentation system as claimed in claim 18 further comprising part of the 3-D property characteristic model above the average of characteristic of interest is drawn with a style different from that below the average.

20. A property visualization and presentation system as claimed in claim 14 further comprising:
    (a) a selected characteristic of the property used to form a vertical dimension of the 3-D model, the said selected characteristic presented as labeled on a top surface of the said 3-D model,
    (b) one or more characteristics of the property including: house number labeled on a side face of the said 3-D model, and
    (c) the color of the top surface and side face of the 3-D property model being determined in accordance with characteristics of the property. average of characteristic of interest is drawn with a style different from that below the average.

21. A property visualization and presentation system as claimed in claim 20 further comprising a horizontal plan representing the average value of the characteristic of interest wherein the vertical distance from the plan to the bottom of the 3-D model is in scale to the average value of the characteristic of interest.

22. A property visualization and presentation system as claimed in claim 21 further comprising part of the 3-D property characteristic model above the average of characteristic of interest is drawn with a style different from that below the average.

23. A property visualization and presentation system as claimed in claim 14 further comprising input means to allow users to:

(a) change the display style of the 3-D model, (b) change the scale used to draw the vertical dimension of 3-D model, and (c) change scales separately for the average value of subject characteristic and the residual of the property characteristic from the average value.

24. A property visualization and presentation system as claimed in claim 14 further comprising input means to allow users to:

(d) change the display style of the 3-D model, (e) change the scale used to draw the vertical dimension of 3-D model, and (f) change scales separately for the average value of subject characteristic and the residual of the property characteristic from the average value.

25. A property visualization and presentation system as claimed in claim 14 further comprising:

(a) display style of the subject property's 3-D model different from those of others in the scene wherein a lighting source may be automatically set up to point to the subject of property to achieve the said effect.

26. A property visualization and presentation system as claimed in claim 14 further comprising:

(a) street names, landmarks, or flowing rivers drawn at the bottom of 3-D model (no vertical dimension exception the symbol itself), and (b) arrows or any other means to represent the north of the earth surface in the 3-D scene.

27. A property visualization and presentation system as claimed in claim 14 further comprising:

(a) rotation means to allow users rotate the 3-D scene or automatically rotate the 3-D scene, and (b) automatically to flip over the labels when the labels are upside down to the viewer in rotation.

28. A property visualization and presentation system as claimed in claim 14 to compare the characteristic of interest of a property of interest further comprising:

(a) means analytically to compare and draw a conclusion of comparison, and (b) the said conclusion of comparison displayed outside and neighboring to, or in an appropriate place inside, the 3-D visualization display.

29. A property visualization and presentation system as claimed in claim 14 further comprising:

(a) the said property is a geographical aggregation of properties, and (b) the said characteristics of a property are aggregated characteristics of the said geographically aggregated properties.

30. A property visualization and presentation system as claimed in claim 14 further comprising the 3-D property characteristics model drawn on top of a three dimensional Land Scene wherein the vertical dimension of the bottom face of the 3-D property characteristics model will follow the earth surface; wherein the top face of 3-D property characteristics model is changed accordingly to be parallel to the bottom.

31. A property visualization and presentation system to evaluate the closeness of a property of interest to a natural hazard comprising:

(a) a base map representing streets, jurisdiction boundaries, geographic grids, land marks, or topography;

(b) a plurality of polygon shapes representing a natural hazard zone transparently overlaid on the said base map;

(c) a plurality of symbols, a selected one symbol representing the subject property displayed at the location of the property on the map;

(d) means analytically to draw conclusion of the said property's closeness to the said natural hazard zone including horizontal and vertical distance to the said hazard zone if the said subject property is outside the said hazard zone; and (e) the said conclusion listed outside and close to the said map display area, or in an appropriate place inside the said map display area.

32. A property visualization and presentation system to evaluate the closeness of a property of interest to a natural hazard as claimed in claim 31 further including a property box comprising:

(a) a display area containing a picture of the property, (b) a list of selected textual characteristics of the property, (c) contact information, and (d) lead lines drawn from the property box to the anchoring point of the property's location on a map.

33. A property visualization and presentation system to evaluate the closeness of a property of interest to a natural hazard as claimed in claim 31 further comprising:

(a) 3-D digital Land Scene displayed as the said base map, (b) the said 3-D digital Land Scene drawn in opaque mode and in a color different from those of the said hazard zone and the subject property, (c) the said natural hazard zone and property geographically overlaid with said digital Land Scene, and (d) the said natural hazard zone drawn in transparent mode.

34. A property visualization and presentation system to evaluate the closeness of a property of interest to a natural hazard as claimed in claim 33 further comprising:

(a) means to derive the vertical dimension of the property from the horizontal dimension of the property, and the digital terrain model used in the said 3-D Land Scene, and (b) means to derive the vertical dimension of the natural hazard zone from the horizontal dimension of the natural hazard, and the digital terrain model used in the said digital Land Scene.

35. A property visualization and presentation system to evaluate the closeness of a property of interest to a natural hazard as claimed in claim 34 further comprising the said property parcel shape drawn with style different and contrast to those of the said digital terrain model and natural hazard including a lighting source set up automatically to point to the property parcel shape.

36. A property visualization and presentation system to evaluate the closeness of a property of interest to a natural hazard as claimed in claim 35 further comprising:

(a) means interactively to rotate the 3-D scene or automatically to rotate the 3-D scene, and (b) means automatically to flip over the labels if the labels in the scene is upside down to the viewer in rotation.

* * * * *